United States Patent [19]

Bell et al.

[11] 4,207,680

[45] Jun. 17, 1980

[54] COORDINATE MEASURING MACHINE HAVING AN AIR COUNTERBALANCE SYSTEM

[75] Inventors: Frederick K. Bell, Centerville; John J. Tuss, Englewood, both of Ohio

[73] Assignee: The Bendix Corporation, Southfield, Mich.

[21] Appl. No.: 904,171

[22] Filed: May 8, 1978

[51] Int. Cl.² ............................................. G01B 5/02
[52] U.S. Cl. .................................. 33/174 R; 33/1 M; 33/DIG. 2
[58] Field of Search ................ 33/1 M, 147 L, 147 N, 33/169 R, 174 R, 174 L, 174 PC, DIG. 2, DIG. 7

[56] References Cited

U.S. PATENT DOCUMENTS

| | | | |
|---|---|---|---|
| 3,354,553 | 11/1967 | Heldmaier | 33/147 N |
| 3,818,596 | 6/1974 | Stemple et al. | 33/1 M |
| 3,831,283 | 8/1974 | Pegella et al. | 33/174 R |

FOREIGN PATENT DOCUMENTS

| | | | |
|---|---|---|---|
| 425247 | 5/1967 | Switzerland | 33/169 R |
| 949189 | 2/1964 | United Kingdom | 33/169 R |
| 1314003 | 4/1973 | United Kingdom | 33/169 R |

*Primary Examiner*—Richard R. Stearns
*Attorney, Agent, or Firm*—Kenneth A. Seaman

[57] ABSTRACT

A coordinate measuring machine (10) having a vertically mounted probe (32), the weight of which is offset by an air counterbalance system (100). The air counterbalance system is adapted to use a source of air under pressure acting upon a piston (127) coupled to the vertically mounted probe (42). A torque converter (130) is mounted between the probe (42) and the piston (127) allowing the piston (127) to have a shorter travel than the allowable vertical travel of the probe (42). The air counterbalance system (100) preferably has components selected and arranged to minimize friction and weight to avoid distorting the precision of measurements on the coordinate measurement machine.

11 Claims, 7 Drawing Figures

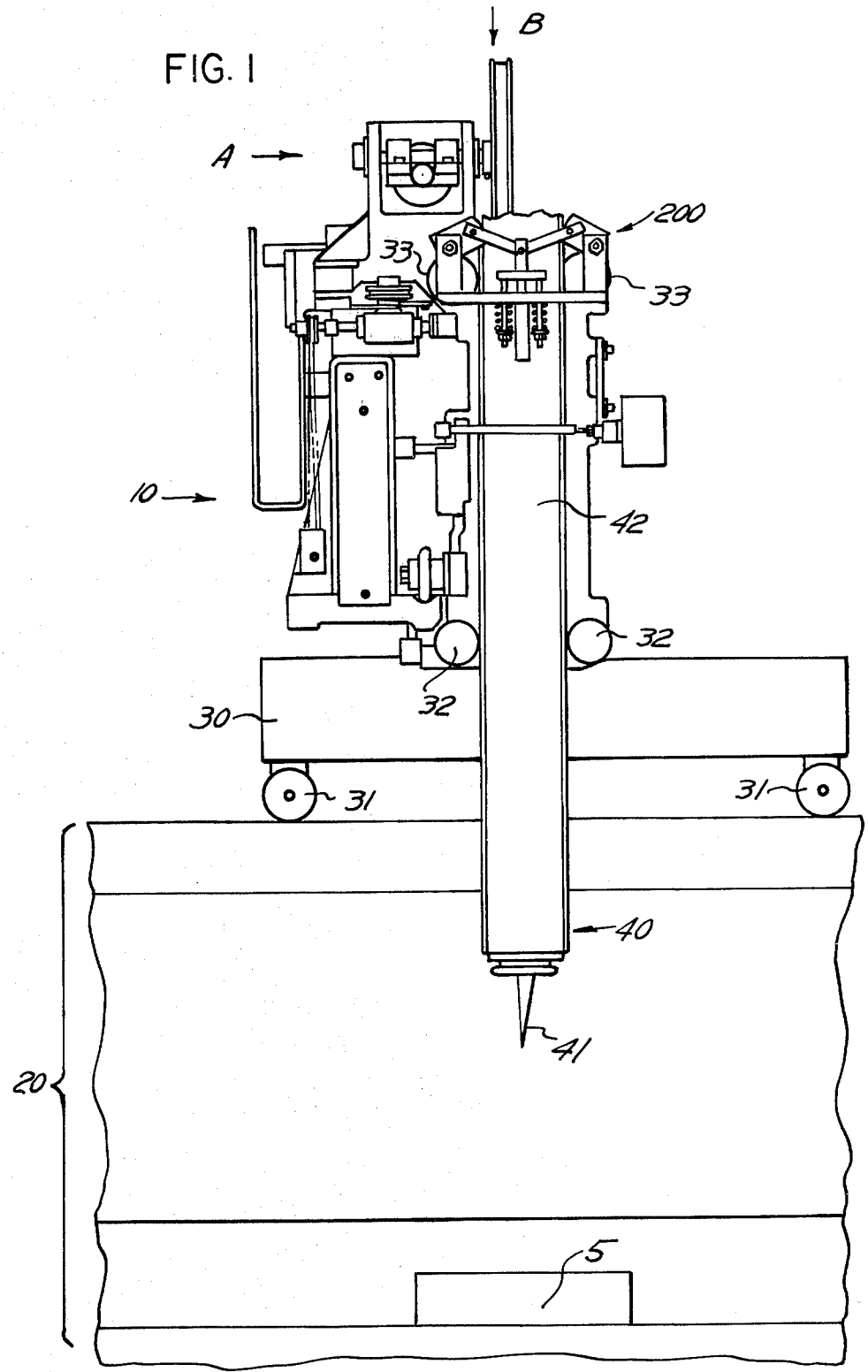

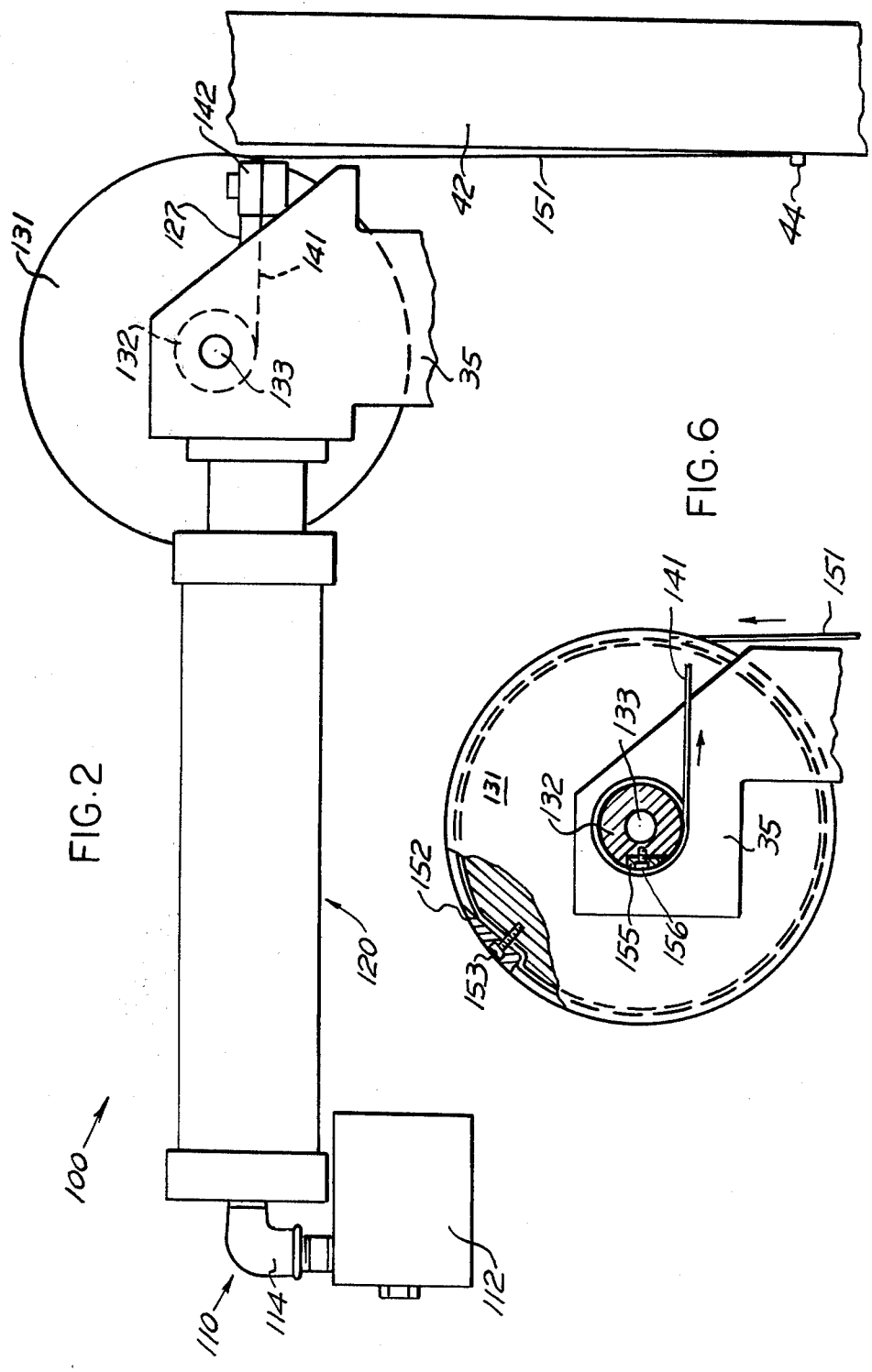

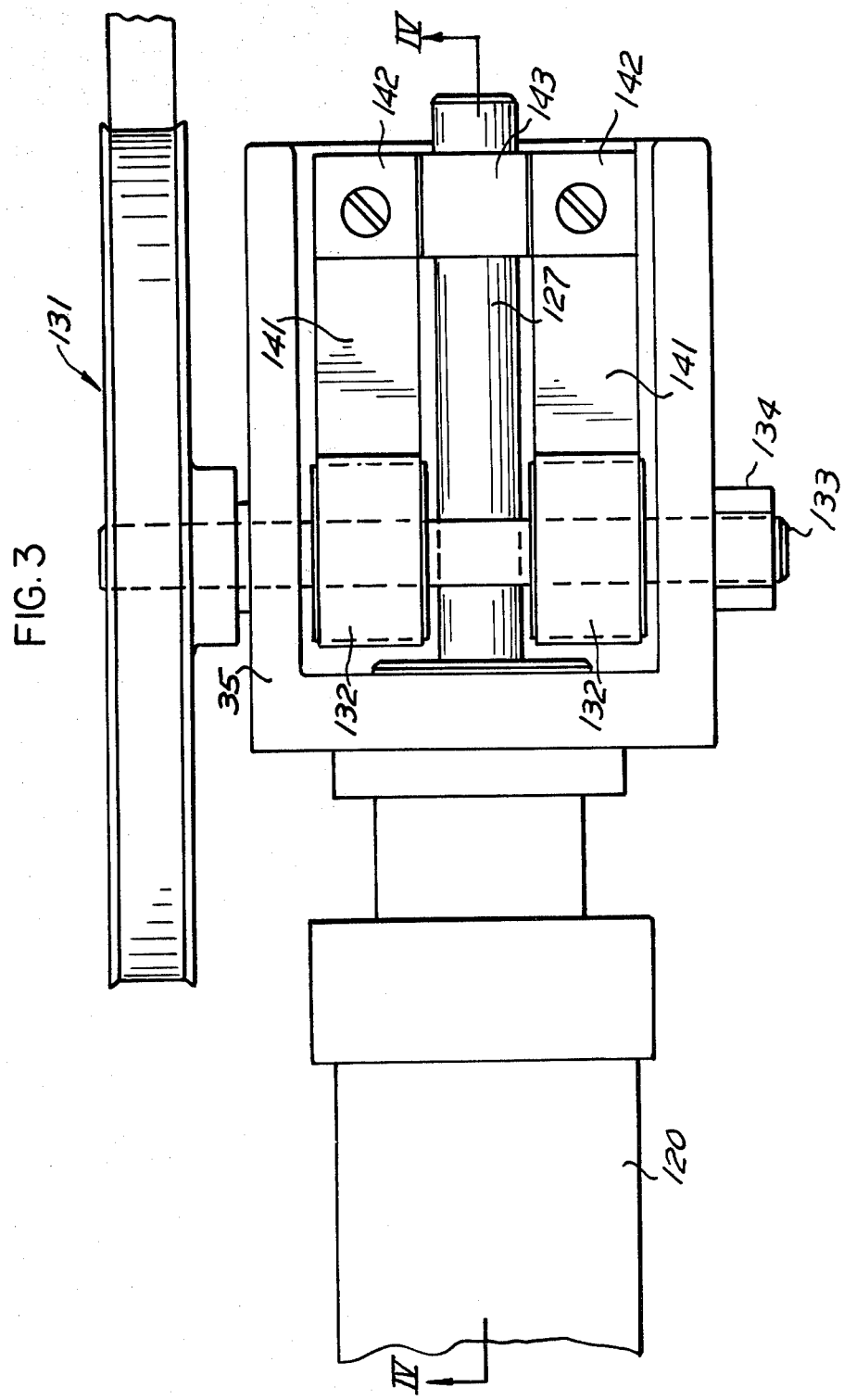

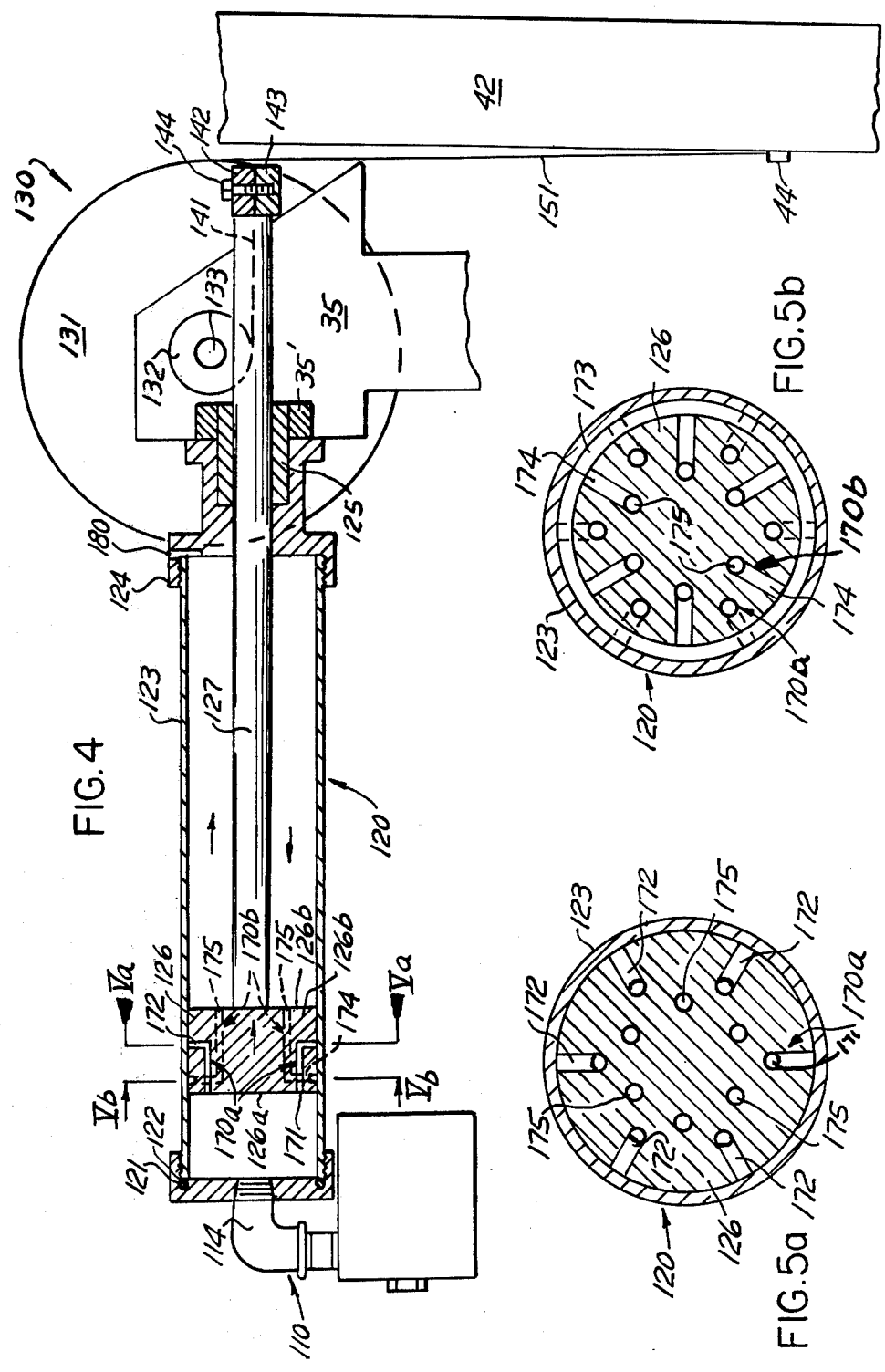

COORDINATE MEASURING MACHINE HAVING AN AIR COUNTERBALANCE SYSTEM

FIELD OF THE INVENTION

The present invention relates to improvements in coordinate measuring machines. More particularly, the present invention relates to an improved air counterbalance system providing a force for offsetting the weight of a vertically mounted probe which is a part of the coordinate measuring machine.

BACKGROUND ART

Coordinate measuring machines are well known in the prior art. One type of coordinate measuring machine has a probe which is mounted with its axis vertical and which is movable up and down to make measurements of the part. The vertically mounted probe is typically mounted to a carriage which is movable horizontally. The movement of the probe or carriage is accomplished either by an operator's grasping the probe and physically moving it in the desired direction in one type of machine or by a motor and automatic controller driving the probe in a more sophisticated type of machine.

In order to accomplish the part measurement, the probe and a carriage must be easily movable. Ideally, the probe and carriage and related apparatus must be light weight.

Further, the coordinate measuring machine must be very accurate. Such accuracy is dependent upon a low friction, which in turn is related to the weight of the movable apparatus which is supported on a fixed apparatus by bearings.

Further, it is desired to have a system which is compact so that the measuring machine is no larger than necessary. As the size of the machine increases, the required length of precision components (such as bearing rails and measuring scales) increases, adding to the cost of manufacturing. Furthermore, a larger machine disadvantageously requires more space in the manufacturing environment, where space conservation is desirable.

The vertically mounted probes must be easily movable in response to the desired movement by an operator. However, the probes must not be movable freely or when no movement is desired, as otherwise the weight of such probe would present a safety hazard as the weight of the probe would bring it down.

Several systems have been suggested to counterbalance the weight of the probe shaft to prevent its falling downward and thereby possibly causing injury or damage. The prior art counterbalancing systems include a mechanical counterbalance, electrical counterbalance and pneumatic counterbalances.

One method of accomplishing the mechanical counterbalance is to provide the probe shaft with an equivalent weight mounted to and offsetting the weight of the probe. Such an arrangement is disadvantageous in that equivalent the weight adds significantly to the friction in the system and makes it more difficult to move the probe and the carriage to accomplish part measurement.

Another mechanical counterbalance approach in the prior art couples the probe to a spring to provide an equivalent force directed opposite to the weight of the probe. Unfortunately, springs are not available which exert a uniform force over a typical operating range of probe shaft, movement which is between 8 and 40 inches depending on the size of the machine. Furthermore, the use of a spring counterbalance could result in friction which is greater than desirable in some applications.

An electric counterbalance is disclosed in U.S. Pat. No. 3,818,596. In the patent, a counterbalance arrangement is disclosed which uses a variable torque, magnetic particle clutch which has an output which is varied in accordance with the weight of the probe shaft.

Air or penumatic counterbalances have also been suggested in the prior art. The prior art air counterbalances have typically been of large size to allow for the air pressure to act on a member which moves a distance equivalent to the vertical movement of the probe.

Also, the prior art air counterbalances have undesirably high inertia and friction.

Unfortunately, these counterbalances have undesirable friction which makes it more difficult to move the probe shaft than is desirable. Further, these systems have characteristically been large and heavy, which have an unsatisfactory effect on the accuracy and repeatability of the coordinate measurements.

According, there is a need in coordinate measuring machines for an improved counterbalancing system for the vertically mounted probe and prior art systems have significant undesirable features and limitations.

DISCLOSURE OF THE INVENTION

The present invention overcomes the limitations and minimizes the undesirable features of the prior art while providing a coordinate measuring machine with an improved counterbalancing system for supporting a vertically mounted probe. The counterbalancing system is rather simple and is relatively inexpensive, while having good accuracy and repeatability of measurements.

To coordinate measurement machine of the present invention allows more uniformity in measurements than the spring-coupled counterbalance.

Further, the air counterbalance of the present invention is relatively light weight and low fricton to reduce the inertia of the apparatus, which allows accurate and repeatable measurements.

The present invention is a coordinate measuring machine (10) having a vertically mounted probe shaft (42), the weight of which is counterbalanced by an air force. The air force acts upon a piston (127) in an air chamber (120) and the piston is mounted through a torque converter (130) to the probe shaft (42). Two low friction tapes (141, 151) are coupled to the torque converter (130) to minimize the friction and error which might be introduced into the system, one tape (141) coupling the torque converter (130) to the piston rod (127), the other tape (151) coupling the torque converter (130) to the probe shaft (42). The torque converter (130) is preferably two cylindrical portions (131, 132) mounted concentrically to an axle (133) which is mounted to a portion (35) of a coordinate measuring machine carriage. The air force acts on the piston and through the torque converter to counterbalance the weight of the probe shaft.

Other objects and advantages of the present invention will become apparent to one skilled in the art in view of the following description and claims and accompanying drawings.

BRIEF DESCRIPTION OF THE DRAWINGS

FIG. 1 shows generally a portion of the coordinate measuring machine including the air counterbalance system of the present invention.

FIG. 2 shows a side view of a portion of the coordinate measuring machine and air counterbalance system of FIG. 1, looking in the direction of the arrow A in FIG. 1.

FIG. 3 shows a top view of a portion of the counterbalance system of FIGS. 1 and 2, looking in the direction of the arrow B in FIG. 1.

FIG. 4 shows a partial cross-sectional view of the counterbalance system of FIG. 2 and 3, as seen looking along the line IV—IV in FIG. 3 in the direction of the arrows.

FIGS. 5a and 5b show cross-sectional views of portions of the counterbalance system, looking along the lines Va—Va and Vb—Vb, respectively, in FIG. 4 in the direction of the arrows.

FIG. 6 is an enlarged view of a torque converter portion of the counterbalance system of the present invention.

DETAILED DESCRIPTION OF THE DRAWINGS

FIG. 1 shows an upper portion of a coordinate measuring machine 10. The coordinate measuring machine 10 includes a base portion 20 and a horizontally movable carriage 30 mounted by bearings 31 to the base 20. A vertically mounted probe assembly 40 is movable mounted to the carriage 30 by two sets of bearings, a lower set 32 and an upper set 33 (partially hidden). The probe assembly 40 includes a probe tip 41 which engages a part 5 to be measured, with the probe tip 41 mounted to a probe shaft 42.

A probe assembly 40 is adapted to be moved vertically either by an operator or an automatic control to inspect various portions of the part 5 and to provide an output indicative of the position of the probe tip 41 at various points in time. The output might be either a display or other suitable record, neither of which is shown, but both of which are well known in the art and form no basis of the invention herein disclosed and claimed.

The major portions of an air counterbalance system 100 are shown generally in FIG. 1.

The coordinate measuring machine 10 of the preferred embodiment has a failsafe protection system 200 of the type described in a concurrently-filed patent applicaton Ser. No. 904,172 filed May 8, 1978 entitled "Coordinate Measuring Machine Having a Failsafe Protection System", the specification of which is hereby incorporated by reference.

FIG. 2 shows a side view of the air counterbalance system 100 shown in FIG. 1, looking in the direction of the arrow A in FIG. 1. The air counterbalance system 100 includes an air delivery system 110, an air cylinder or chamber 120 and a torque converter 130. The air delivery system 110 acts upon the air cylinder 120 which, in turn, has a movable piston (not shown) which is mechanically coupled, through the torque converter 130, to the probe shaft 42.

The air delivery system 110 includes an air regulator 112 for delivering air under a substantially constant pressure to the air cylinder 120. The regulator 112 maintains a set constant air pressure in the cylinder 120 during a static state of the piston (i.e., when the piston is stationary) and also during a dynamic state (i.e., when the piston is moving in either direction of piston motion along the axis of the cylinder 120). A conduit 114, with appropriate pressure fittings, couples the air under pressure from regulator 112 to the air cylinder 120.

The air cylinder or chamber 120 is mounted to a carriage portion 35 which is a rigid portion, preferably a casting, which is integral with the carriage.

The torque converter 130 is also mounted to the carriage portion 35. The torque converter 130 includes a first or larger reel 131 and a second or smaller reel 132, with both reels 131, 132 mounted to an axle 133.

The smaller reel 132 has a tape 141 coupled between the smaller reel 132 and a block 142 which is mounted to a portion of a piston rod 127 which is a part of and extends from the air cylinder or chamber 120.

Although not shown in FIG. 2, directly behind the smaller reel 132 is an other smaller reel of the same size and mounted to the axle 133. The other smaller reel is coupled by a second tape (directly behind the tape 141) to a second block (directly behind the block 142) which is couple mounted to the piston rod 127.

An other tape 151 extends from the larger reel 131 and is coupled to the probe shaft 42 by a block 44.

The tapes 141, 151 are preferably made of steel and thin enough to be flexible (to wrap around the reels 131, 132) while strong enough to transmit the forces between the probe shaft 42 and the air cylinder 120.

FIG. 3 is a plan view looking down on the coordinate measuring machine of FIG. 1 in the direction of the arrow B. The axle 133 extends through the reels 131, 132. A collar 134 holds the axle 133 in place within the portion 35 of the carriage. Each reel 132 is mounted to one block 142 by one tape 141. The rear portion of the piston rod 127 is shown extending through the portion 35 and coupled to the blocks 142 by a member 143. The piston rod 127 extends rearwardly from the air cylinder or chamber 120.

The axle 133 is mounted to the carriage portion 35 by antifriction ball bearings to reduce the friction resulting from any rotation of the reels 131, 132.

FIG. 4 shows a cutaway view of the air cylinders or chamber 120 as seen looking along the line IV—IV in FIG. 3. As shown in FIG. 4, the air cylinder or chamber 120 includes a first cap 121 through which air from the air delivery system 110 is provided through the conduit 114. An 0-ring 122 provies a seal between the cap 121 and a body 123 of the air chamber 120 to contain the air under pressure within the air chamber.

A piston head 126 and the piston rod 127 are movably mounted within the body 123 of the air chamber 120. The piston head 126 and the piston rod 127 are movable in the direction of the two arrows in FIG. 4, that is, axially within the chamber 120.

The piston rod 127 is mounted horizontally and extends through a rear cap 124 of the air cylinder 120. The rear cap 124 is mounted to the carriage portion 35, a portion 35' of which is shown cut away, with another portion 35 shown behind. A hole 180 vents the cylinder body 123 rearwardly of the piston hed 126 to atmospheric pressure, which is lower than the air under pressure being applied to the body 123 forwardly of the piston head 126 by the air delivery system 110. This pressure differentially causes a continuing force on the piston head 126 and the piston rod 127 acting rearwardly in the cylinder 120.

The tape 141 is mounted to the piston rod 127 by the blocks 142 and the member 143. A screw 144 holds the block 142 to the member 143, with the end of the tape 141 held between the block 142 and the member 143.

FIG. 4 shows some detail of the piston head 126. The piston head 126 includes two sets of air passages 170a, 170b. The passages 170a provide an air cushion between the head 126 and the body 123, while the passages 170b provide a vent flow path for pressurized air which would otherwise flow past the forward peripheral edge of piston head 126. Each of the passages 170a has a first passage portion 171 and a second pasage portion 172. The first pasage portion 171 is generally horizontal and extends forwardly in the cylinder from the middle of the piston head 126 to a forward face 126a of the head 126, generally parallel to the length of the piston rod 127 and the axis of the air cylinder 120. The second portion 172 extends at right angles to and radially outwardly from the first passage portion 171 toward the walls 123 of the chamber, intermediate the length of the piston head 126. The passages 170b each include a first passage portion 174 which extends radially inwardly into the piston head 126 from an annular groove or undercut 173. A second passage portion 175 extends rearwardly from the passage portion 174 to a rear face 126b of the piston 126.

FIG. 5a illustrates further detail of the passages 170a in the piston head 126, looking in the direction of the arrows from the line Va—Va in FIG. 4. The air passages 170a include the first (horizontal) passage portions 171 (which appears as circles in FIG. 5a) and outwardly radiating passages portions 172 which extend from the horizontal portions 171 outwardly toward the body 123 of the chamber.

The body 123 of the chamber has an inside diameter slightly larger (a few ten-thousands of an inch) than outside diameter of the piston head 126. Air under pressure from the air delivery system 110 channeled through the passage portions 171, 172 is directed between the outside diameter of the piston head 126 and the body 123 to provide a very small air cushion (a film or air bearing) between the piston head 126 and the body 123 to reduce the friction as the piston head moves along the body.

FIG. 5b shows further detail of the passages 170b in the piston head 126. The passages 170b include the passage portions 174 extending radially inwardly from the annular groove 173 which is approximately 0.012 inches wide and 0.09 inches deep and extends around the piston head 126. The passage portions 175, shown as circles in the FIG. 5b, couple the passage portions 174 to the rear face 126b of the piston head 126 and prevent air from flowing past the piston head to degrade the air film or cushion.

FIG. 6 illustrates the mounting of the tapes to the reels 131, 132 of the torque converter 130. The larger reel 131 and of the smaller reel 132 are mounted to the carriage portion 35 by the axle 133. The tape 151 is wrapped several times around the reel 131 and is fixed to the reel 131 by a bracket 152 which is held to a recess in the reel 151 by a screw 153 which is inserted into a recessed hole in the bracket 152.

Similarly, the tape 141 is held to the reel 132 by a bracket 155 and a screw 156. Advantageously, the end of the tape 141 is held by the bracket 155 and the screw 156, with several revolutions of the tape 141 wrapped over the bracket 155 and the screw 156 and around the reel 132.

In the automatically-controlled probe shaft movement techniques, the larger reel 131 might be provided with a flange having gear teeth and a motor driving a complimentary gear could drive the probe shaft up and down through the gear teeth and complimentary gear.

Referring back to FIG. 4, the apparatus operates as follows. The probe shaft 42 has a weight which in some applications is approximately twenty pounds. Although the air counterbalance of the present invention may be adjusted (by changing the regulated pressure in the regulator and thus the air delivery system 110) to exert a force a small amount either greater or less than a precise counterbalance (i.e., either slightly over or under counterbalanced), in many applications an equilibrium is desired, in which case the air pressure is adjusted to exert approximately a twenty pound upward force on the shaft 42. The torque converter 130 in the preferred embodiment uses a larger reel 131 having a diameter approximately five times the diameter of the smaller reel 132. Ignoring internal losses and friction, which have been minimized by the air cushion, bearings 125 and the tapes 141, 151, an air force of approximately one hundred pounds must be applied to the piston head 126 and transmitted through the piston rod 127, the tapes 141, 151, and the reels 131, 132, to the shaft 42. The air pressure must be the one hundred pounds divided by the surface area of the piston head 126.

Assuming such an air pressure has been applied to just balance the weight of the probe shaft, the probe shaft 42 will move neither up nor down without an external force (e.g. an operator's movement of the probe shaft). The probe shaft 42 will respond readily to such an external force because of its previously balanced condition.

An upward lift of the shaft 42 by the operator (even with a rather small force) allows the tape 151 to move up and coil around the reel 131, allowing the reels 131, 132 to rotate counter-clockwise in FIG. 4 and the tape 141 to uncoil from the reel 132, with the piston rod 127 and the piston head 126 moving to the right in FIG. 4; of course, the air from the delivery system 110 acting on the piston head 126 provides the necessary force to move the reels in the indicated direction and keep the tracks in tension. The air under pressure causes a constant force on the piston head and the piston head and piston rod will move faster than the probe to maintain a counterbalancing force on the probe shaft force by keeping the tapes in tension.

As the piston head 126 moves rightward in FIG. 4 (as it does when the probe shaft 42 is moved up) within the body 123, the air pasages 171, 172 receive air and direct it outward between the head 126 and the body 123, creating a friction-reducing air cushion.

A downward movement of the probe shaft 42 by an external force causes an opposite movement of the counterbalance system. The tape 151, which if fixed at the block 152 to the probe shaft 42, is moved down with the shaft 42, causing the tape 151 to unwind from the reel 131 and rotate the reel 131 clockwise at the same time. The reel 132 rotates simultaneously with and in the same direction as the reel 131. The rotation of the reel 132 clockwise winds the tape 141 onto the reel 132, requiring the block 142 and the member 143 to move leftward in the FIG. 4 illustration. The block 142 and the member 143 are fixed to the piston rod 127, and the leftward movement causes the piston rod 127 and the connected piston head 126 to move leftward also, against the air pressure from the air delivery system 110.

Other objects and advantages of the present system will be apparent to those skilled in the art. For instance, another torque converter or mechanical advantage apparatus might be substituted for the two reel system disclosed. Wires of metal or other materials might be substituted for the tapes and other force sources might be substituted for the air under pressure. Accordingly, the foregoing description should be taken as illustrative of the best mode of the present invention and not as limiting applicants' invention to any particular structure.

Having thus described the invention, what is claimed is:

1. In a coordinate measuring apparatus of the type including a base; a carriage movably mounted to said base; a probe for engaging an article to be measured; and means for mounting the probe to the carriage for vertical movement of the probe with respect to the carriage, the improvement wherein the mounting means comprises:

a force converter mounted to the carriage having an input and an output, said force converter receiving a first force on the input, which first force acts through a first distance, and transmitting a second force on the output, which second force acts through a second distance with said first force being greater than said second force and said first distance being less than said second distance;

means coupled to the input of the force converter for receiving and transmitting a force of air under pressure to the force converter input; and means for coupling the probe to the output of the force converter so that the weight of the probe provides a force on the output of the force converter, whereby when air under pressure is applied to the force receiving and transmitting means, the force of the air under pressure is transmitted to the force converter to balance the weight of the probe with the force of the air being greater than the weight of the probe and with the probe moving a relatively greater distance than the force receiving member.

2. A coordinate measuring apparatus of the type described in claim 1 wherein the force receiving and transmitting means comprises a piston movably mounted within a chamber for reciprocal movement within the chamber.

3. A coordinate measuring apparatus of the type described in claim 2 wherein the piston includes a head having at least one internal passage for receiving a portion of the air under pressure and directing it between the piston head and a wall of the chamber to provide an air film therebetween to reduce the friction of the piston when the piston moves.

4. A coordinate measuring apparatus of the type described in claim 3, wherein the piston head has a forward surface and at least one peripheral surface which faces the chamber wall and the internal passage extends between the forward surface and an aperture in the peripheral surface intermediate its length.

5. A coordinate measuring machine of the type described in claim 4 wherein the piston head has an annular groove in the peripheral surface forward of the aperture of the internal passage and an additional internal passage couples the annular groove to the rear surface of the piston head.

6. A coordinate measuring machine of the type described in claim 4 wherein there are a plurality of internal passages extending between the forward surface of the piston head and the peripheral surface, with said plurality of internal passages being spatially separated by an approximately uniform separation.

7. A coordinate measuring machine of the type described in claim 1 wherein the output of the force converter includes a first member having an arcuate surface having a larger diameter and the force converter input includes a second member having an arcuate surface having a smaller diameter, with said first and second members being coaxial with respect to one another.

8. A coordinate measuring machine of the type described in claim 1 wherein the first and second members are cylindrical and mounted to the carriage by an axle.

9. A coordinate measuring machine of the type described in claim 1 wherein the means coupling the probe to the force converter and the means coupling the force convert to the member are flexible metallic bands to provide a low-friction coupling.

10. A coordinate measuring machine of the type described in claim 1 wherein the means for receiving a force comprises a piston head movably mounted within a chamber into which pressurized air is introduced and the means for transmitting the force is a piston rod coupled to the piston head to displace in response to a force on the piston head.

11. A machine of the type described in claim 10 wherein the pressurized air is maintained at a predetermined pressure.

* * * * *